Oct. 23, 1962     D. A. COBB     3,059,665
TWO-WAY CHECK VALVE FOR PUMPS AND THE LIKE
Filed Dec. 30, 1960
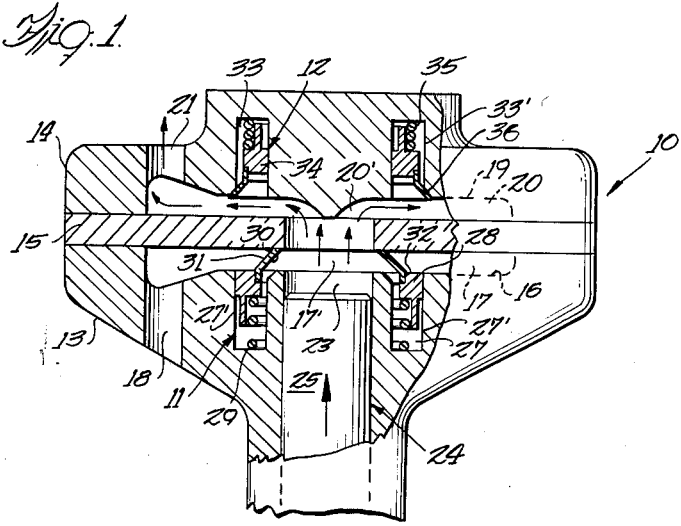
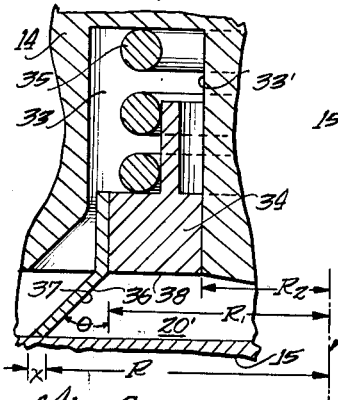
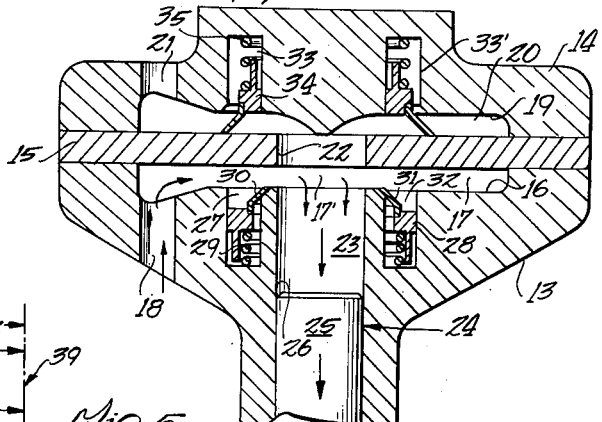
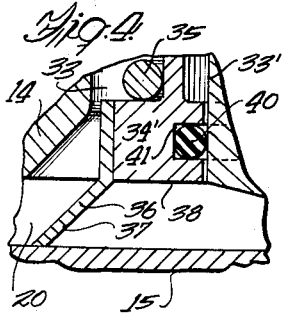
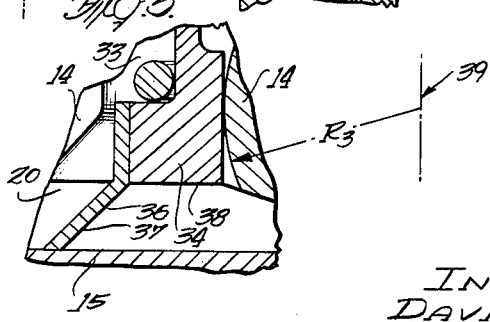
INVENTOR
DAVID A. COBB
ATTORNEY

United States Patent Office 3,059,665
Patented Oct. 23, 1962

3,059,665
TWO-WAY CHECK VALVE FOR PUMPS AND THE LIKE
David A. Cobb, Riverdale, Ill., assignor to International Harvester Company, Chicago, Ill., a corporation of New Jersey
Filed Dec. 30, 1960, Ser. No. 79,703
6 Claims. (Cl. 137—512)

This invention relates to a two-way check valve for pumps and the like. More in particular this invention relates to a unit having inlet and outlet check valves wherein the fluid flows radially with reference to movement of the valve mechanism. Still more in particular this invention relates to a check valve wherein the valve operating force is not dependent upon the flow area across the valve.

In the check valves heretofore known the valve opening force is dependent upon the area of fluid flow leading to the valve and the valve closing force is dependent upon a resilient element such as a compression spring. In the present invention the valve opening force is not dependent on the area of flow leading to the valve. This is accomplished by employing a radial fluid flow across an annular shaped axially movable valve element. Thus one advantage in the present construction is that of a larger flow passage which size is not dependent upon the size of the valve element. Another advantage is that the direction of flow of fluid across the valve element is substantially unchanged.

It is therefore a prime object of the invention to provide a check valve wherein the valve operating force is not dependent upon the fluid passage area.

Another object of the invention is to provide a check valve wherein the normal component of force of the fluid flow is employed to operate the movable valve element.

A further object of the invention is to provide a check valve having an axially movable valve element which is also rockable for improved primary fluid flow sealing relation when the valve is closed.

A still further object of the invention is to provide a check valve according to the preceding objects wherein a movable valve element is provided with a secondary seal for preventing leakage across a secondary passage resulting from clearance due to manufacturing tolerance.

Another object of the invention is to provide a low cost, compact two-way check valve according to the preceding objects particularly adapted for fluid pumps.

These and other important objects inherent and encompassed by the invention will become apparent from the following description, the appended claims and the annexed drawings wherein:

FIGURE 1 is a side elevation, partly in section and partly broken away, illustrating the general arrangement of an assembly of a two-way check valve embodying this invention wherein the inlet valve element is closed and the outlet valve element is open.

FIGURE 2 is similar to FIGURE 1 except that it is a complete section and shows the outlet valve element closed and the inlet valve element open.

FIGURE 3 is an enlarged sectional view in side elevation, partly broken away, illustrating the outlet valve element in greater detail from that of FIGURES 1 and 2.

FIGURE 4 is a side elevation in section and partly broken away illustrating the outlet valve element of FIGURE 3 provided with a secondary sealing member to prevent fluid leakage along the slidable surface of the valve element.

FIGURE 5 is similar to FIGURE 3 except that the stationary housing member adjacent the sliding surface of the valve element is provided with spheroidal surface to allow a limited rotative movement of the valve element about a transverse axis so that the seating of the valve element's primary sealing surface is sealingly engaged throughout its entire periphery.

Referring now to the drawings the numeral 10 indicates a valve unit having an inlet check valve 11 and an outlet check valve 12. The valve unit 10 includes a lower casing 13 and an upper casing 14 separated by an annular plate or valve seat 15 which are held together as a stationary structure by any conventional means such as by bolts (not shown).

The lower casing 13 is provided with a generally annular shaped lower recess 16 forming an annular inlet passage 17 connected to inlet port 18 which in turn is communicatively connected to a source of fluid at low pressure (not shown). Similarly the upper casing 14 is provided with a generally annular shaped upper recess 19 forming an annular outlet passage 20 connected to outlet port 21 which in turn is communicatively connected to a high pressure receiver (not shown).

The valve seat 15 is provided with a centrally disposed bore 22 for communicating the outlet passage 20 with the inlet passage 17 and a pump chamber 23 of a fluid pump generally indicated at 24. The pump 24 comprises a conventional piston 25 which is reciprocably slidable in cylinder bore 26. The piston 25 is reciprocated in a conventional manner such as by a crankshaft (not shown) driven by a power source (not shown).

Disposed concentrically in the lower casing 13 is a lower cylindrical groove 27 as best shown in FIGURES 1 and 2. Within the lower groove 27 is an annular shaped axially slidable inlet valve member 28 which is urged upwardly by a compression spring 29. The upper portion of the valve member 28 is provided with a rigidly connected frusto-conical valve element 30 as shown in FIGURES 1 and 2. From this it will be apparent that a fluid pressure differential between the pump chamber 23 and inlet port 18 wherein the latter is of higher pressure, such as occurs when the piston 25 moves downwardly, the fluid pressure of the inlet port 18 acts on the conical surface 31 of the frusto-conical element 30 and the annular surface 32 thereby compressing the spring 29 for opening the inlet valve member 28. In FIGURE 1 the inlet valve member 28 is shown in the closed position wherein the upper portion of the element 30 is in sealing relation with the valve seat 15.

Disposed concentrically in the upper casing 14 is an upper cylindrical groove 33 as best shown in FIGURE 3. Within the upper groove 33 is an annular shaped axially slidable outlet valve member 34 which is urged downwardly by a compression spring 35. At this point it will be observed that the outlet valve member 34 is constructed similar to that of inlet valve member 28 except it is the outer side of the inlet valve member 28 that is in slidable relation with the outer wall 27' of groove 27 whereas in the case of the outlet valve member 34 it is the inner side of the valve member 34 that is in slidable relation with the inner wall 33' of groove 33. The lower portion of the valve member 34 is provided with a rigidly connected frusto-conical valve element 36 as shown best in FIGURE 3. From this it will be apparent that fluid pressure differential between the pump chamber 23 and outlet port 21 wherein the former is of higher pressure, such as occurs when the piston 25 moves upwardly, the fluid pressure in the outlet passage 20' acts on the conical surface 37 of the frusto-conical element 36 and the annular surface 38 thereby compressing the spring 35 for opening the outlet valve member 34. In FIGURES 2 to 5 the outlet valve member 34 is shown in closed position wherein the lower portion of the element 36 is in sealing relation with the valve seat 15.

Now referring to FIGURE 3 it will be seen that the conical angle $\theta$ of the frusto-conical valve element 36 should be selected appropriate to the desired characteristics of the valve operation. If the angle $\theta$ is zero then the fluid pressure P in the outlet passage 20′ for moving the valve member 34 in a direction from closed to open position is limited by the annular surface 38. Thus the force F urging the valve member 34 from closed to open position according to the following formula:

$$F = \pi P(R_1^2 - R_2^2) + f'$$

where $R_1$ and $R_2$ are the radial distances from the axis 39 of movement of the valve member 34 and $f'$ is the compressive force of the spring 35.

The force $f$ urging the valve member 34 toward a closed position is shown by the following formula:

$$f = \pi p[(R_1+x)^2 - R_2^2] + f'$$

where $p$ is the fluid pressure in the outlet port 21 and $x$ is the distance of frusto-conical valve element 36 at the contacting surface of the valve seat 15. Of course when the angle $\theta$ is zero the frusto-conical valve element 36 is a portion of a cone having infinite height which then becomes a cylinder.

Now if the angle $\theta$ is greater than zero but less than 90° the distance R is finite and greater than $R_1$ and the distance $x$ is also finite and increased as a function of the tangent of the angle $\theta$. From this it becomes readily apparent that the fluid pressure differential. P—p, required to initially move the valve element 34 from its closed position as seen in FIGURE 3 becomes less as the value of the angle $\theta$ increases above zero to an angle less than 90°. However as soon as the frusto-conical valve element 36 unseats the fluid from passage 20′ moves toward the outlet port 21 through the annular space defined by the value $x$ and the valve seat 15 which now aspirates fluid in the groove 33. This fluid aspiration force has the effect of reducing the fluid pressure in the groove 33 which in turn reduces the valve closing force P dismissed above. The force then urging the valve member 34 toward a fully opened position as shown in FIGURE 1 is the pressure P on the annular surface 38 plus the upward component of the dynamic or kinetic energy of the moving fluid across the annular area defined by R—$R_1$. The upward component force of the kinetic energy of the moving fluid is proportional to the trigonometric sine of the angle $\theta$.

From the foregoing it is readily apparent that the initial movement of the valve member 34 in the opening direction is a function of the force of the static pressure differential, P—p, of the fluid and the further movement of the valve member 34 is the sum of the forces of fluid pressure acting on the annular surface 38, and the upward component force of kinetic energy of moving fluid on the frusto-conical element 36 less the fluid pressure in the aspirated recess 33. Thus it can be seen that the degree of sensitivity for operating the check valve of this invention can be varied by selecting the angle $\theta$ and the compressive characteristics of the spring 35 appropriately without altering dimensional characteristics of the flow passages. Furthermore the flow path across the valve 12 is linear and therefore frictional losses arising from deflecting the fluid's path of travel across the valve are avoided. It should also be obvious that similar results occur in the operation of the inlet check valve 11.

The modification shown in FIGURE 4 is confined to the addition of an annular sealing element, which may be in the form of a conventional O ring 40 positioned in the circumferential groove 31 in the valve member 34′. The inclusion of the sealing element 40 is to prevent or at least minimize leakage of fluid from the higher pressure side of the check valve into the lower pressure recesses 27 or 33 between the sliding surfaces of the valve members 28 or 34 and the casings 13 or 14, respectively.

FIGURE 5 is a further modification wherein the casing 14 is provided with a curved surface, such as a spherical section of radius $R_3$, in sliding relation with the valve member 34. This arrangement allows a limited rotative movement in a transverse direction for sealing the frusto-conical valve element 36 throughout its periphery on the valve seat 15. This feature overcomes the leakage effects due to the unavoidable manufacturing tolerance in alining the valve seat 15 normal to the path of movement of the valve members 28 and 34. It is of course obvious that the valve member 34 of FIGURE 5 may also be provided with a sealing element 40 shown in FIGURE 4 if desired.

Having thus described preferred embodiments of the invention it can now be seen that the objects of the invention have been fully achieved and it must be understood that changes and modifications may be made which do not depart from the spirit of the invention or from the scope thereof as defined in the appended claims.

What is claimed is:

1. A fluid pressure operated check valve comprising a casing and a transversely disposed annular valve seat, said casing having an annular recess forming a radial flow passage across said seat communicatively connected with fluid inlet and outlet means of said valve, a cylindrical groove axially disposed in said casing, said groove having a flared portion adjacent said flow passage, an axially movable valve member positioned in slidable sealing relation with one cylindrical wall of said groove forming a chamber communicatively connected with said outlet means, resilient means in said chamber positioned to urge said valve member in a direction toward said valve seat, said valve member having a frusto-conical valve element adapted for reception into said flared portion of said groove and engageable in sealing relation with said valve seat whereby inlet fluid pressure in excess of outlet fluid pressure unseats said valve member thereby reducing the fluid pressure in said chamber by aspiration of fluid flow in one direction across said frusto-conical valve element and alternately pressurizing said chamber for seating said valve member when fluid pressure in said outlet means exceeds fluid pressure in said inlet means.

2. A fluid pressure operated check valve according to claim 1 wherein said valve member is provided with a circumferential groove adjacent said one cylinder wall and having an annular shaped sealing element retained therein, said sealing element being positioned in slidable sealing relation with said one cylindrical wall thereby preventing fluid leakage between said chamber and said fluid inlet means.

3. A fluid pressure operated check valve according to claim 1 wherein said one cylindrical wall of said groove adjacent said valve member is spherically curved to permit limited transverse rotational movement of said valve member thereby ensuring complete seating of said frusto-conical valve element on said valve seat throughout the periphery thereof.

4. A unitary pump two-way check valve mechanism having a fluid inlet check valve and an outlet check valve comprising upper and lower casings separated by an annular valve seat element each of said casings having an annular recess adjacent said valve seat forming radial flow passages across said valve seats, said upper casing having an outlet port communicatively connected to one of said passages and said lower casing having an inlet port communicatively connected to the other of said passages, an upper cylindrical groove disposed axially in said upper casing, said upper groove having an outwardly flared portion adjacent one of said passages, a lower cylindrical groove disposed axially in said lower casing, said lower groove having an inwardly flared portion adjacent the other of said passages, an axially movable first valve member positioned in slidable sealing relation with the inner wall of said upper groove forming a first chamber communicatively connected with said outlet port and an axially movable second valve member positioned in slidable sealing relation with the outer wall of said lower groove forming a second chamber in communication with said inlet part, resilient means disposed in each of said chambers adapted to urge said valve members toward said valve seat element, said first valve member having an upper frusto-conical valve element adapted for reception into said outwardly flared portion of said upper groove, said second valve member having a lower frusto-conical element adapted for reception into said inwardly flared portion of said lower groove, said valve members being engageable with said valve seat element in sealing relation whereby fluid pressure in said outlet port exceeding fluid pressure in said inlet port pressurizes said first chamber for urging said first valve member in sealing relation with said valve seat and fluid pressure in said inlet port exceeding fluid pressure in said outlet port unseats said second valve member thereby reducing fluid pressure in said second chamber by aspiration of fluid flow from said inlet port through said other passage across said lower frusto-conical valve element to said pump and alternately pressurizing said second chamber for urging said second valve member toward sealing relation with said valve seat and unseating said first valve member thereby reducing fluid pressure in said first chamber by aspiration of fluid flow from said pump through said one passage across said upper frusto-conical valve element to said outlet port when fluid pressure in said inlet port is greater than fluid pressure in said outlet port.

5. A unitary two-way check valve mechanism according to claim 4 wherein each of said valve members is provided with a circumferential groove adjacent the slidable walls of said cylindrical grooves in said casings, an annular shaped sealing element disposed in each of said circumferential grooves thereby preventing fluid communication between said chambers and said fluid inlet port.

6. A unitary two-check valve mechanism according to claim 4 wherein a portion of said walls of said cylindrical grooves in slidable relation with said valve members is spherical shaped to permit limited transverse rotational movement thereby ensuring complete seating of said frusto-conical elements on said valve seat throughout the periphery thereof.

References Cited in the file of this patent

UNITED STATES PATENTS

| | | |
|---|---|---|
| 1,057,089 | Prellwitz | Mar. 25, 1913 |
| 1,708,158 | Steedman | Apr. 9, 1929 |
| 2,289,946 | Weatherhead | July 14, 1942 |
| 2,472,933 | Anderson | June 14, 1949 |

FOREIGN PATENTS

| | | |
|---|---|---|
| 578,738 | Great Britain | July 10, 1946 |
| 581,052 | Great Britain | Sept. 30, 1946 |
| 677,544 | Great Britain | Aug. 20, 1952 |